United States Patent [19]

Kato

[11] 4,067,809
[45] Jan. 10, 1978

[54] FILTERING SYSTEM FOR FISH-FARMING WATER

[76] Inventor: Yukio Kato, No. 2-1, Hanegi 2-chome, Setagaya, Tokyo, Japan

[21] Appl. No.: 681,041

[22] Filed: Apr. 28, 1976

[30] Foreign Application Priority Data

June 12, 1975 Japan .................................. 50-70225
June 16, 1975 Japan .................................. 50-71965
Jan. 9, 1976 Japan .................................. 51-627[U]

[51] Int. Cl.$^2$ ............................................. E04H 3/20
[52] U.S. Cl. ....................................... 210/169; 119/3;
210/195 R; 210/336
[58] Field of Search ............... 119/3, 5; 210/169, 195, 210/197, 305, 336

[56] References Cited

U.S. PATENT DOCUMENTS

| | | | |
|---|---|---|---|
| 3,377,991 | 4/1968 | Rubert | 119/5 |
| 3,490,416 | 1/1970 | Kelley et al. | 119/5 |
| 3,513,978 | 5/1970 | Newsteder | 210/169 |
| 3,696,788 | 10/1972 | Day et al. | 119/5 |
| 3,720,319 | 3/1973 | White | 210/169 |
| 3,724,423 | 4/1974 | Day et al. | 119/5 |
| 3,815,547 | 6/1974 | Willizer et al. | 119/5 |
| 3,841,999 | 10/1974 | Bennett et al. | 210/169 |
| 3,848,567 | 11/1974 | Garber, Jr. | 119/5 |
| 3,850,806 | 11/1974 | Cohen | 210/169 |

Primary Examiner—Theodore A. Granger
Attorney, Agent, or Firm—Oblon, Fisher, Spivak, McClelland & Maier

[57] ABSTRACT

A filtering system is disclosed for effectively filtering the water of aquariums for tropical or salt-water fish, the water of fish-farming ponds, and/or any other type of fish-farming water. The system includes a filtration tank partitioned into a storage chamber, a filtration chamber, and a discharge chamber, and the fish-farming water is successively passed through the storage and filtration chambers so as to be purified, and is discharged along the water surface by means of a discharge mechanism within the discharge chamber. A lift pipe is provided at one end of the storage chamber, and filters and vacancies are alternately arranged in a parallel manner within the filtration chamber, with an open spaced defined thereabove. The water level of the filtration tank is maintained lower than the top of the filters, and the filter layers may be sets of two water-passing plates, such as, for example, multipore plates, net-type plates, or the like, with the filter medium, such as, for example, glass wool, sand, or the like, packed therebetween or attached thereto. The discharge chamber is equipped with a discharge pipe which has an opening directed along the surface of the water, and in this manner, the fish-farming water is prepurified in the storage chamber, further purified in the filtration chamber, and discharged along the water surface so as to be uniformly circulated in an installation for fish-farming. The water is constantly maintained in an aerobic state and an extremely high purification efficiency is obtained.

10 Claims, 19 Drawing Figures

FILTERING SYSTEM FOR FISH-FARMING WATER

BACKGROUND OF THE INVENTION

1. Field of the Invention:

The present invention relates generally to filtering systems, and more particularly to a filtering system for effectively filtering the water of aquariums for tropical or salt-water fish, the water of fish-farming ponds, and-/or any other type of fish-farming water.

2. Description of the Prior Art:

Conventional filtering systems are fish-farming water include, for example, in the case of a water tank, the so-called internal filtering type in which an intake frame is installed upon the bottom of the tank, with glass wool, sand, or the like, spread thereover, and a lift pipe extending to the water surface is mounted upon the frame, the treated water passing through the frame being sent upwardly through the pipe, by means of air, to the water surface and discharged therefrom; or the external filtering type in which a filtration vessel is installed at the top of the tank and water is brought up by means of a pump, or the like, the treated water passing through the filtration vessel being allowed to drop down into the water tank. All of such systems, however, are extremely inferior in the purifying efficiency by means of aerobic bacteria because the activated sludge floats inside the tank during the circulation of the water, and in addition, since droppings from fish, leftover feed, and other dirt become deposited upon the filter layers and remain there undecomposed by means of bacteria, the same normally clog the filter layers within a month's time, and consequently, the same have to be removed at periodic intervals and cleaned for regeneration. Thus, substantial labor is required.

In such types of filtration tanks, the sludge formed from the dirt decomposed by means of aerobic bacteria clogs the filter medium making the passage of water therethrough quite difficult. In addition, the sludge itself becomes anaerobic thereby losing its purifying potential and adversely affects the filtration to a greater extent with an increasing amount of its deposition. Still further, the water inside the tanks cannot be uniformly circulated which results in an inhomogeneity in purification, whereby the water becomes anaerobic in a two month time period, and becomes stale, with the passage of a long period of time, which adversely affects the farm fish if the water is not replaced frequently. Moreover, these tanks are unable to render the inside active, with the oxygen in the atmosphere admixed insufficiently, and are not suitable for farming of salt-water fish in particular. In the case of a filtration system of the external filtration type which only deposits the treated water through a small opening into the water tank, the water near the position of deposition flows downwardly to be circulated, however, the farming water near the surface and located at a distance from the point of deposition remains still and is not substantially purified.

SUMMARY OF THE INVENTION

The present invention has been proposed to eliminate the aforenoted shortcomings of the prior art, and is seen to comprise the partitioning of a filtration tank into a storage chamber and a filtration chamber, both having a side length shorter than the width and height, and the provision within the filtration chamber, alternately in the width direction, of filters and vacancies which allow the water to pass therethrough in the widthwise direction. An open space is provided above the filters and vacancies, and the water level of the storage chamber is maintained lower than the top of the filters within the filtration chamber.

When the fish-farming water is supplied into the storage chamber via a lift pipe, droppings, leftover feed, and other dirt is allowed to enter but simultaneously therewith, oxygen from the atmosphere is admixed therewithin so as to prevent the inside from becoming anaerobic and to enhance the propagation of aerobic bacteria. Thus, the water in the storage tank is pre-purified by the deposition of activated sludge formed by means of the decomposition of the dirt by the aerobic bacteria. At the same time, dirt coming into the filtration chamber is controlled so as to reduce the causes for the clogging of the filtration chamber.

In the filtration chamber, a filter film of aerobic bacteria and activated sludge is formed upon the surfaces of the filters and such effectively purifies the water passing therethrough or in contact therewith. Simultaneously, the activated sludge or aerobic bacteria, isolated within the vacancies defined between the filters, are prevented from flowing into the water tank, by causing them to remain in vacancies and/or to adhere to the filters. Since a plurality of filters are installed in the filtration chamber, the filter area is accordingly large and so is the area of the formed filter film. Thus, the water passing through the storage and filtration chambers is not only effectively purified, but also cleaning and replacement of the filter medium is made unnecessary for an extended period of time.

In addition, a water discharge chamber is provided at one end of the filtration tank. By facilitating the flow of the treated water, filtered by the activated sludge in the filtration tank, into the water discharge chamber so as to be discharged substantially horizontally along the surface of the fish-farming water of a water tank, or the like, a current moving from the water surface to the interior and bottom of the tank, and upon the opposite side thereof, is caused due to the flowing impetus of the discharged water, which also allows oxygen to be mixed efficiently therein. In addition, the water within the water tank, or the like, is circulated throughout the same and enhances the overall purifying efficiency.

As is obvious from the foregoing description, it is enabled by this invention to make use of the activated sludge, previously a cause for the lowering of the purifying efficiency, but to contrary, for the promotion of the purifying efficiency, and to purify the water through the storage chamber, and the filtration chamber by means of the filter layers of an extremely high filtration efficiency, and through the water tank, or the like within which an abundant amount of oxygen is simultaneously mixed. Therefore, the invention is suitable and useful for the farming of any fish, particularly salt-water fish.

In addition, since this invention eliminates the clogging of the filter layers and the stagnation of the tank water, no periodical cleaning of the filter layers, nor replacement of the water in the tank, or the like, is particularly required and it suffices to simply remove the activated sludge accumulated within the filtration tank as required. While the water in the tank, or the like, becomes turbid and contaminated normally in approximately a 5 month period, even with this invention, it does not become stale as in the previous method or system, and consequently, no replacement of the water is particularly needed except for maintaining the beauty thereof as in an aquarium for the aesthetic appreciation of the fish.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF THE ILLUSTRATED EMBODIMENTS

Referring now to the drawings, and more particularly to FIGS. 1-4 thereof, there is shown an embodiment wherein the filtration tank 1 is immersed within a water tank $a$, the tank 1 being an open-top filtration tank with the side length being extremely shorter than the width and height. The interior of the tank is divided, in the width direction by means of a partition plate 2, into a storage chamber 3 and a filtration chamber 4, and furthermore, at one end thereof, by means of a separation plate 5 so as to define a water discharge chamber 6. The storage chamber 3 and the filtration chamber 4 are interconnected by means of a through-hole 7 formed within the lower portion of the partition plate 2 at the end thereof opposite the water discharge chamber 6, and the filtration chamber 4 and the water discharge chamber 6 are interconnected by means of an appropriate number of passages or apertures 8 provided within the upper part of the separation plate 5.

Within the bottom wall 9 of the storage chamber 3 there is provided a water inlet 10, a water intake mechanism 11 being installed thereon. In the illustrated embodiment, the water intake mechanism 11 comprises a lift pipe 12 with the lower end projecting downwardly below the bottom wall 9 and the upper end opening in the widthwise direction within the storage chamber 3 at almost the same level as the water surface $b$ of the water tank $a$. An air supply pipe 13 is connected to the root of the lift pipe 12, the water inlet 10 being of course provided at the lower end of the lift pipe 12.

Since the lift pipe 12 is located within the end of the storage chamber 3 opposite the water discharge chamber 6, supplying air by connecting an air pump, or the like, to the air supply pipe 13 causes the water at the lower part of the tank $a$ to be induced into the water inlet 10, mixed with the air, discharged from the upper end of pipe 12, circulated through the storage chamber 3 and introduced into the filtration chamber 4 through means of the hole 7. At this time, the dirt contained within chamber 3 becomes activated sludge while being decomposed by means of aerobic bacteria in the process of circulation of the water within the storage chamber 3, part of it being accumulated in the storage chamber thus, in effect, prepurifying the water within the storage chamber before introduction of the same into the filtration chamber 4. It is to be noted that the purifying potential can be enhanced by packing such materials as coarse glass wool in the storage chamber 3 which allow adhesion or attachment of the activated sludge thereto.

The filtration chamber 4 contains the vacant portions or areas 14 and the filter portions or areas 15 which are arranged alternately. The water level of the water tank $a$ must be kept lower than the top of the filters 15 which consist of sets of two water-passing plates 17, such as, for example, perforated plates, net or sieve type plates, and the like, arranged in parallel and at fixed intervals, with the filter medium 18, such as, for example, glass wool, sand, or the like packed in the space defined between the plates. The plates 17 must be lower in height than that of the filtration tank 1 and are installed at fixed intervals therein. Therefore, the vacancies 14 are formed between the filters 15, and an open space 16 is formed between the top of the filters 15 and the top of the filtration tank 1, allowing the direct passage of water therethrough.

The water introduced into the filtration chamber 4 through the passage 7 is gradually purified as it passes widthwise through the vacancies 14 and the filters 15. Within the filters 15, the water is cleaned of the contained leftover feed, droppings, or the like, and in the vacancies 14, the water flows widthwise while circulating up and down, constantly maintaining the interior in an aerobic state. With the addition of the effect of the activated sludge, the purifying efficiency is greatly enhanced.

The process of purification inside the filtration tank may be described more in detail as follows.

Figures 2, 3, 4:
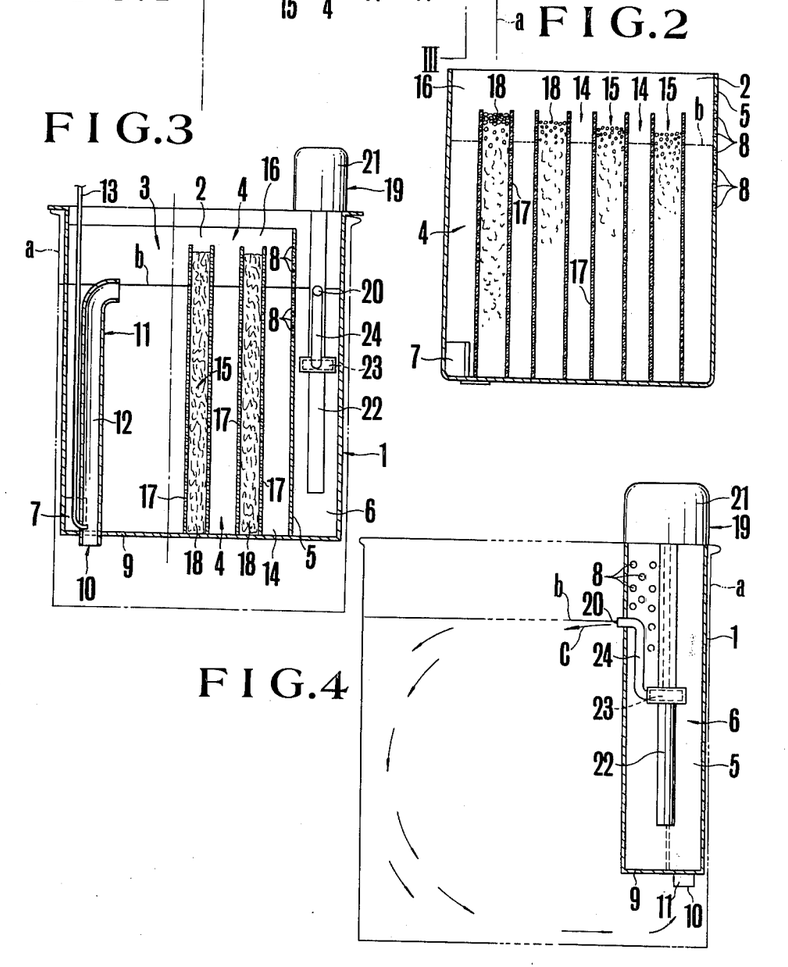
FIG. 2 is a cross-sectional view of the filtration chamber of FIG. 1.
FIG. 3 is a cross-sectional view taken along the line II-II in FIG. 1.
FIG. 4 is a cross-sectional view taken along the line III-III in FIG. 1.

Unless the filters 15 are clogged, the water introduced from the storage chamber 3 into the filtration chamber 4 through means of the passage 7 passes successively through the vacancies 14 and the filters 15 and is sufficiently purified, owing to the propagation of aerobic bacteria, and enhanced by the contained air and the presence of the activated sludge, particularly in passing through the filters 15.

When the filter 15 nearest the passage 7 is clogged with activated sludge, or the like, water does not flow in the widthwise direction, and consequently, the water level within the first vacancy 14 is gradually raised. If the water level exceeds the height of the first filter 15, the water overflows the same and drops into the adjacent vacancy 14 via the open space 16. The water then successively passes widthwise through the subsequent filters and vacancies and flows out into the fish farming tank a after being so purified.

It generally occurs that in the frontal part of the apparatus, the filters 15 become clogged, however, as the water level is raised, activated sludge, and the like, which cause clogging, tend to become disengaged from the filters and become deposited on the bottom of the chamber 4 within the vacancies 14. Therefore, as no more clogging takes place, and, in addition, as aerobic bacteria are actively propagating with the activated sludge deposited within the vacancies, the purifying efficiency is greatly enhanced.

When all of the filters 15 become clogged, the water from the storage chamber overflows the immediate filter, circulates within the adjacent vacancy, overflows the next adjacent filter via the open space 16, and drops into the adjacent vacancy. Therefore, within the respective vacancies, the purifying effect is by no means lowered, because the overflow water circulates, thereby constantly maintaining an aerobic state, the water activates the propagation of aerobic bacteria and the effect of the activated sludge, and it also removes the film formed upon the filters which is the cause of the clogging.

An anaerobic state occurs inside the filtration chamber when almost all the water passes widthwise through the open space 16 with the overflow water scarcely flowing into the vacancies and with no water passing through the filters 15. Although it suffices in this case to remove the accumulated activated sludge as required, water can be dropped and circulated within the respective vacancies by providing an inclined guide plate which forcibly guides the water passing through the open space 16 into the vacancies, or by gradually lowering the heights of the filters along the direction of flow. It is to be noted, however, that the water, flowing down within the vacancies penetrating into the core of the filtration medium from behind the unclogged filters, not only enhances the propagation of the aerobic bacteria but also washes the clogged surfaces, and thus, the widthwise passage of water within the filters, as well as the purifying effect, is regenerated.

As is obvious from the foregoing description, the inside of the filtration chamber can be maintained in an aerobic state whether clogging has taken place or not and such effectively purifies the water passing therethrough by promoting the propagation of aerobic bacteria and the accumulation of the activated sludge to a great extent. In addition, since any clogging of the filters is gradually eliminated by the flowing water, cleaning for regeneration of the filtration potential is not needed for a long period of time.

Figure 1:
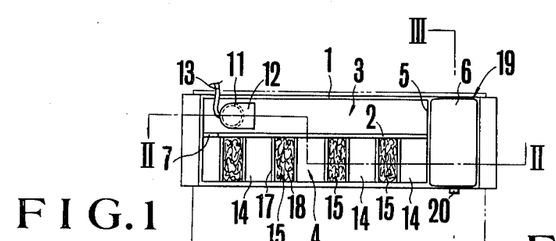
FIG. 1 is a plan view showing one embodiment of the present invention.

The water thus purified flows into the discharge chamber 6 through means of the apertures 8, and by installing the water discharge outlet 20 at almost the same position as the water surface b of the water tank a, as well as the water discharge mechansim 19 within the water discharge chamber 6, the water coming from the filtration chamber 4 is discharged almost in parallel with the water surface b by means of the water discharge mechanism 19. The discharge mechanism 19 comprises a motor 21 installed at the top of the filtration tank 1, with an intake pipe 22 suspended therefrom, a turbine blade 23 being provided at the middle of pipe 22. A discharge pipe 24 is disposed vertically upwardly as an extension of the case of the turbine blade 23, and the water discharge outlet 20 is directed toward the front of the tank 1, the discharge outlet being close to and in parallel with the surface of the fish farming water. When the motor 21 is operated, the turbine blade 23 is rotated at a high rate of speed, and the treated water in the lower part of the discharge chamber 6 is induced through the lower end of the intake pipe 22, raised through the discharge pipe 24, and discharged from the discharge outlet 20.

The water discharged from the discharge outlet 20 forms a current C, as shown within FIG. 4, which initially flows along the water surface b of the water tank a, is deflected downwardly at the opposite wall of the tank, and flows along the bottom wall 9 toward the intake opening 10. Therefore, if the filtration tank 1 is installed at one end of the water tank a and the discharge outlet 20 is directed toward the opposite end thereof, the water within the tank forms a current which circulates from the surface toward the bottom and flows substantially uniformly throughout the tank, thereby enhancing the overall purifying efficiency.

In addition, as the water flows from the surface toward the bottom, control of the water temperature by means of a heater installed within the tank is facilitated because any temperature difference tends to be eliminated. If the water discharging capacity of the water discharge mechanism 19 is larger than the water intake capacity of the water intake mechanism 11, the water level of the storage chamber 3, filtration chamber 4, and discharge chamber 6 gradually drops making it impossible to purify sufficiently. In this case, if a small aperture is made within the bottom wall 9 of the storage chamber 3 for interconnecting the tank a with the inside of the tank 1, such an amount of water which is lacking within the water intake mechanism 11 is supplementally supplied to the storage chamber 3, and consequently, the water levels of the filtration chamber 4 and the water discharge chamber 6 can be made to be the same as that of the water tank a.

Figure 5:
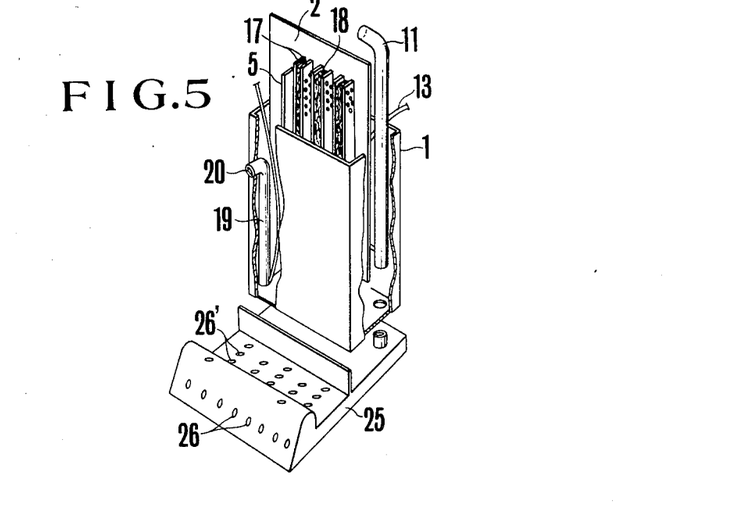
FIG. 5 is an exploded perspective view showing another embodiment of the invention.
Figure 6:
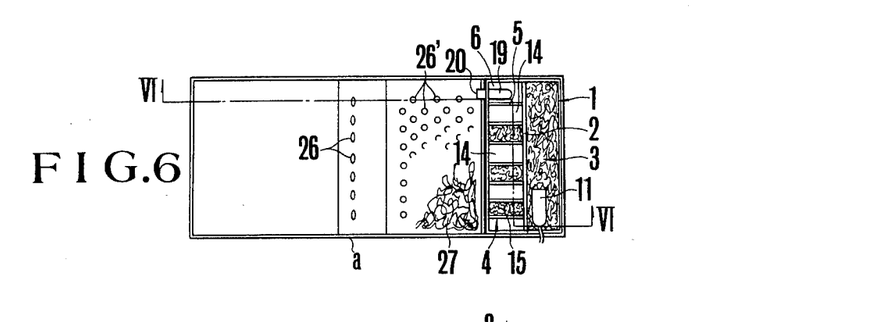
FIG. 6 is a plan view of the apparatus of FIG. 5.
Figure 7:
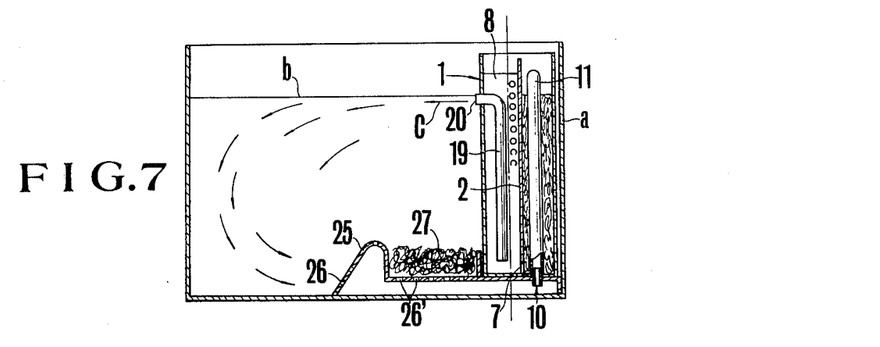
FIG. 7 is a cross-sectional view taken along the line VI-VI in FIG. 6.

Within a second embodiment of the present invention as illustrated in FIGS. 5–7, the water intake frame 25 is installed upon the bottom of the water tank a, in order to enhance the purifying effect, and the filtration tank 1 is installed at one side of the water intake frame 25, the water intake inlet 10 of the water intake mechanism 11 being provided inside of the water intake frame 25. Intake holes 26 and 26' are provided within the front end and top portion of the water intake frame 25 and an aggregate 27 is disposed upon the top thereof so as to cover the intake holes 26'. The water discharge mechansim 19 comprises the lift pipe and the air supply pipe, similar to the water intake mechanism 11, the discharge outlet 20 being provided at almost the same position as the water surface b of the water tank a.

Therefore, in this embodiment, when the filtration tank 1 is installed within the water tank a and the water intake mechanism 11 and the water discharge mechanism 19 are set in operation, the water flows into the water intake frame 25, is circulated in the storage chamber 3, purified in the filtration chamber 4, pumped out from the water discharge chamber 6 by means of the water discharge mechanism 19, and flows out as a current C almost in parallel with the water surface b of the tank a from the discharge outlet 20. When the current reaches the opposite side of the water tank, it is deflected downwardly and goes along the bottom thereof and into the water intake frame 25 through means of the intake holes 26 and 26'.

Figure 8:
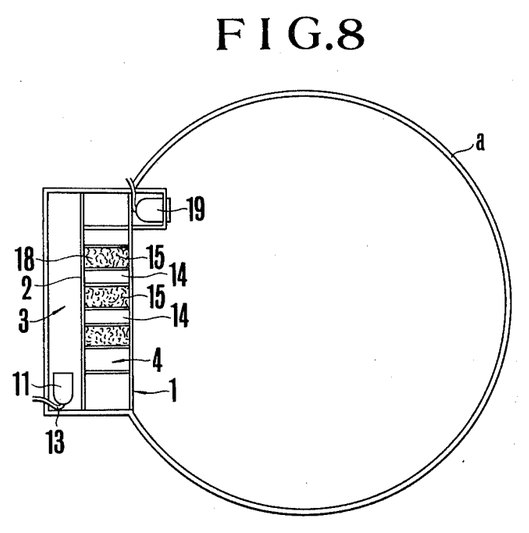
FIG. 8 is a plan view showing another embodiment of the present invention.
Figure 9:
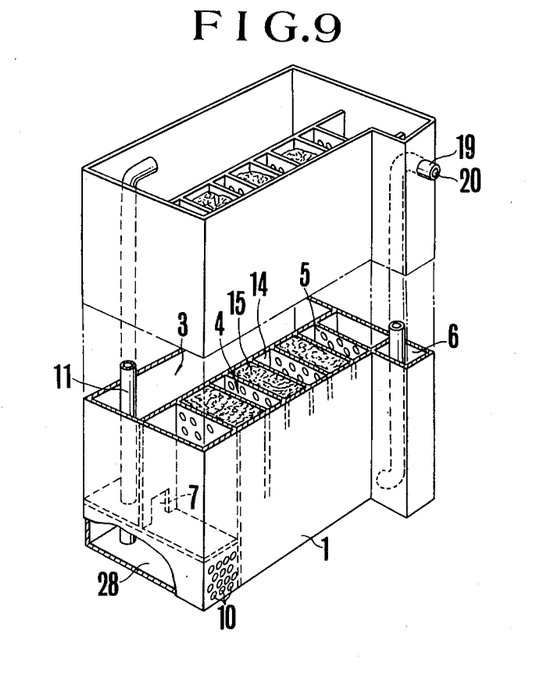
FIG. 9 is a perspective view of the filtration tank of FIG. 8.

Within a third embodiment of the present invention as illustrated in FIGS. 8-9, the filtration tank 1 is installed exteriorly of a cylindrical water tank 1. Water-intake inlet apertures 10 are formed within the lower front side of the filtration tank and are interconnected to the lower end of the water intake mechanism 11 via a tunnel-like passage 28. The water flowing out of mechanism 11 is introduced into the filtration chamber 4 through means of the passage 7, after being stored in the storage chamber 3, and is allowed to pass widthwise through the filtration chamber 4, pumped up from the water discharge chamber 6 by means of the water discharge mechanism 19 and discharged onto the water surface from the discharge outlet 20 which is disposed in the direction extending along the water surface of the tank.

In this embodiment, by setting the water intake mechanism 11 and the water discharge mechanism 19 in operation, the water at the lower part of the tank is taken in, purified in the filtration chamber 4 and discharged almost in parallel with the water surface by means of the water discharge mechanism 19. Therefore, the water in the water tank is circulated, thereby increasing the mixing of the oxygen as well as enhancing the purifying efficiency, and thus maintains a suitable state for the farming of fish. Since the width of the water tank is narrow in this embodiment, the water current from the discharge outlet 20 propagates downwardly in a substantially zigzag pattern inside the tank, and as the current impetus is strong, is taken in through the water inlet 10. Under these conditions, the water in the tank is most suitable for the farming of fish because it is always kept flowing and is uniformly purified throughout while simultaneously accomplishing the homogeneous mixing of the oxygen.

Figure 10:
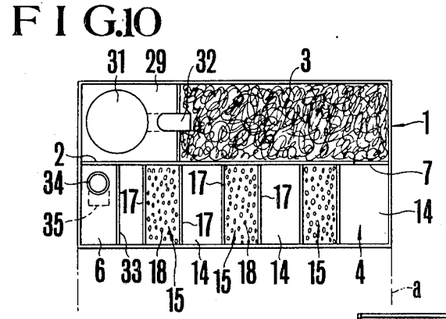
FIG. 10 is a plan view showing another embodiment of the present invention.
Figure 11:
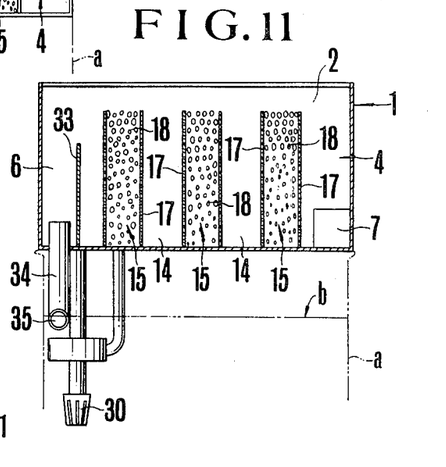
FIG. 11 is a cross-sectional front view of the apparatus of FIG. 10.
Figure 12:
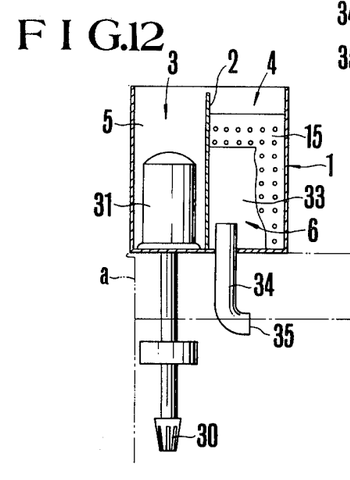
FIG. 12 is a cross-sectional side view of the apparatus of FIG. 10.

In the fourth embodiment of the present invention, as illustrated in FIGS. 10-12, the filtration tank 1 is installed at one end, and on top, of the water tank $a$. The inside of the filtration tank 1 comprises the storage chamber 3 and the filtration chamber 4 separated by means of the partition plate 2, the storage chamber 3 being further divided at one end thereof to provide for a pump chamber 29. Within the pump chamber 29, a water pump 31 is installed which has a water inlet 30 disposed below the water surface $b$ of the water tank $a$ in such a manner that the water near the bottom of the water tank is taken in therethrough, the water outlet 32 of the water pump 31 being directed toward the storage chamber 3. Therefore, when the pump 31 is set in operation, the fish-farming water in the water tank is taken in through the water inlet 30 so as to be pumped upwardly, flows out from the water outlet 32, and remains in the storage chamber while circulating.

The filtration chamber 4 is divided at one end thereof by means of the partition plate 33 so as to provide the water discharge chamber 6, and the filtration chamber 4 and the storage chamber 3, and the water discharge chamber 6 and the pump chamber 29, are respectively arranged in a side-by-side manner. Since the partition plate 33 has a height less than that of the filters 15, water drops into the discharge chamber 6 when the water level of the filtration chamber 4 exceeds the height of the partition plate 33. The discharge chamber 6 is equipped with the discharge unit 34 at the bottom portion thereof, and since the discharge unit 34 is a means for forcing the water dropping into the discharge chamber 6 to be discharged along the water surface $b$ of the water tank $a$, it can be a substantially L-shaped pipe with the upper end thereof opening within the discharge chamber 6 while the lower end or the lateral opening 35 thereof is located at the water surface $b$.

Figure 13:
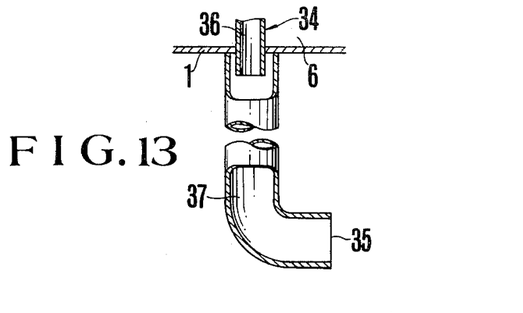
FIG. 13 is an enlarged sectional view of the discharge mechanism of FIG. 12.

The discharge unit 34, however, preferably comprises, as illustrated in FIG. 13, a small pipe 36 installed within the discharge chamber 6 and projecting therebelow, and a pipe 37 of a larger diameter than that of pipe 36 installed below the discharge chamber 6, the lower end opening 35 of pipe 37 being located at the water surface $b$. With such a construction, the water flowing downwardly within the small pipe 36 is conducted into the larger pipe 37 under the influence of gravity and the hydrostatic pressure within chamber 6, and consequently, the force of the water flowing from the opening 35 is quite strong.

Therefore, if the opening 35 is directed in the direction parallel to the sides of the water tank, the current reaches the opposite side of the tank and is deflected downwardly at such opposite end so as to move along the end wall thereof and at the lower end thereof is made to move along the bottom wall. Thus, an overall circulation of water results throughout the inside of the water tank and the fish-farming water is successively passed through the filtration tank thereby enhancing the purifying efficiency to a remarkable extent. Also, innumerable minute waves are generated in the fluid current along the water surface, increasing the mixed amount of the atmospheric oxygen, and therefore, the optimum condition for fish farming is attained.

Figure 14:
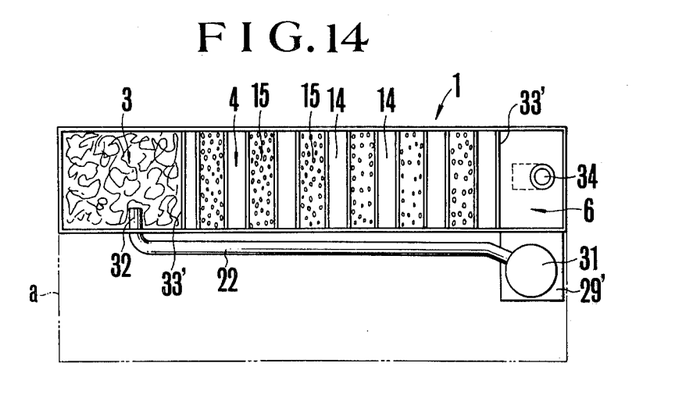
FIG. 14 is a plan view showing another embodiment of the present invention.
Figure 15:
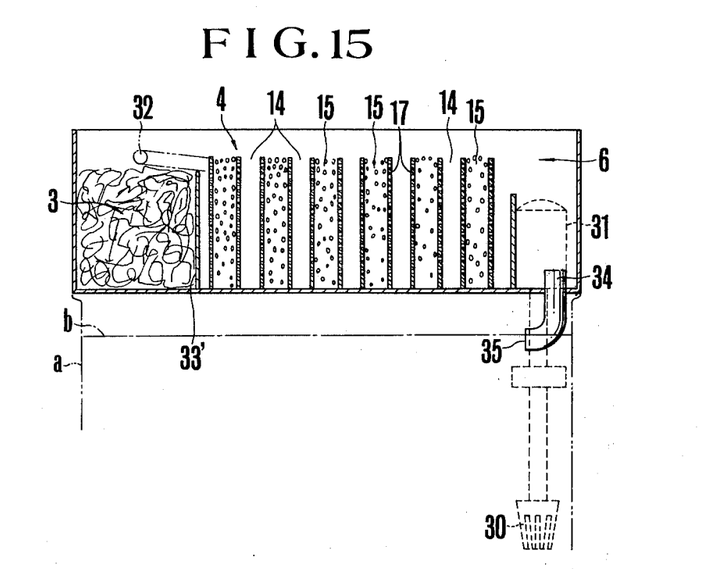
FIG. 15 is a cross-sectional front view of the apparatus of FIG. 14.

In a fifth embodiment of the present invention as illustrated in FIGS. 14 and 15, the filtration tank is again installed upon the top of the water tank $a$ however, the same extends in the width direction thereof. The inside of the filtration tank is successively partitioned into the storage chamber 3, the filtration chamber 4, and the discharge chamber 6 by means of the partition plates 33' which have a height less than that of the filtration tank. By linking the connection pipe 22 to the water pump 31 in the unit 29', and extending the same so as to have an opening in the storage chamber 3, the fish-farming water is able to be stored in the storage chamber 3, pass through the filters 15 while overflowing the partition plates 33', and flow out from the discharge chamber 6 along the water surface.

In this case, if the outflow is directed along the bottom of the filtration tank instead of toward the pump 31, the outflow can be uniformly circulated within the water tank and the purifying efficiency can be further enhanced. Installation of the intake mechanism, including the water pump 31, to the side of the discharge chamber 6 is provided so as to cause the water discharged from the discharge outlet 35 to be circulated from the top of the tank to the bottom thereof, the same being taken in by means of the intake opening 30. It is to be noted further that within any embodiment, the discharge unit 34 should be capable of free rotation in order to freely enable a change in the direction of the opening 35.

FIGS. 16-19 show further embodiments of the filtration chamber other than the one illustrated in the foregoing FIGURES. According to the embodiment of FIG. 16, the filters 40 are synthetic resin plates, to both surfaces of which filter grains, such as, for example, sand, gravel, or the like, are attached. In order to install the same in the filtration chamber 4, the filters are inserted from above and fixed in the supporting pieces 44 projecting from the side and bottom walls of the tank. In installing the same, the filters 40 with the lower end in contact with the bottom wall, and the filters 40' which are disposed above the bottom by means of a spacing 43, are alternately installed and the upper end of the filters 40 and 40' are disposed below the top of the filtration tank 1 so as to provide the open space 16. The vacancies 41 are thus formed between the two side walls of the filtration chamber 4 and the filters 40, and between the filters 40 and 40', and in this manner, a vertical serpentine flow path is formed due to the spacings 43 above the bottom wall of the tank and below the filters 40'. In this case, the water level of the filtration chamber is preferably lower than the upper ends of the filters 40.

Figure 16:
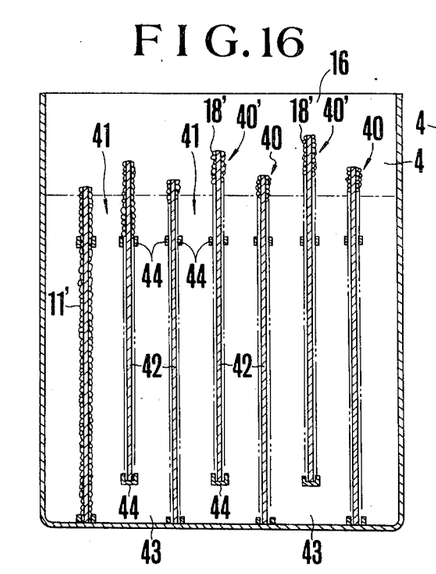
FIGS. 16–18 are cross-sectional views showing different variations of the apparatus of FIG. 2.

When the water containing the aerobic bacteria and activated sludge is introduced into the filtration chamber 4, it first overflows the first filter 40 and drops into the adjacent vacancy 41. As the water traverses the serpentine flow path formed by the vacancies 41, the bacteria and the sludge not only adhere to the filter grains 18', or float within the water, but also become deposited on the bottom of the tank chamber. Therefore, the water moving along the path is purified by being in contact with the aerobic bacteria and the activated sludge, and since the water also contains a sufficient amount of oxygen, it can be sufficiently purified without rendering anaerobic the bacteria and activated sludge presented in the filters 40 and the vacancies 41.

Figure 17:
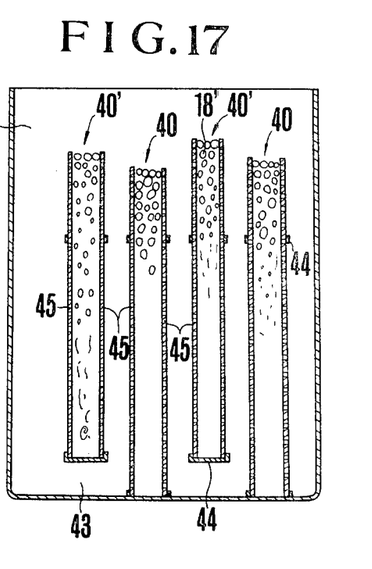
Figure 18:
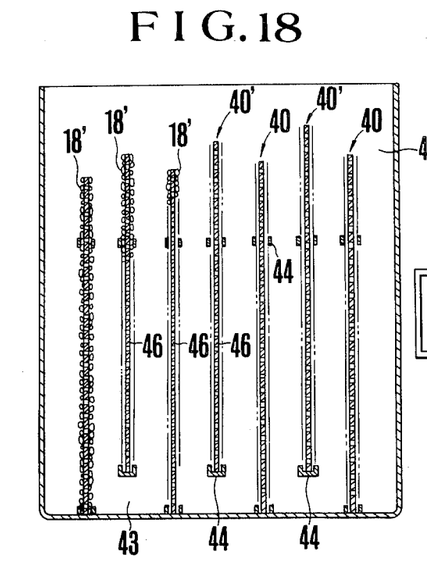
Figure 19:
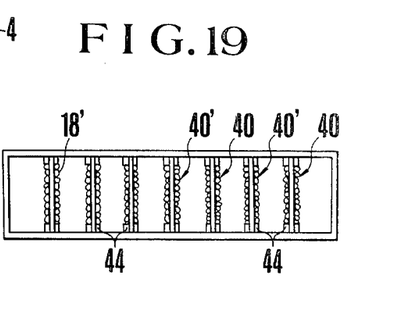
FIG. 19 is a plan view of the apparatus of FIG. 16.

In the embodiment illustrated in FIG. 17, the filter layers 40 and 40' comprise sets of two water-passing plates 45 such as multipore, or net-type plates, installed alternately, with the filter medium 18', such as, for example, sand, gravel, and glass wool packed between the two plates as in the first embodiment. In the embodiment illustrated in FIG. 18, the filter layers 40 an 40' comprise the water-passing plates 46, such as multipore plates, grate-type frames, and the like, with the filter grains 18' , such as, for example, sand, gravel, or the like, secured thereto as in FIG. 16.

In any of the embodiments noted hereinabove, the filter layers allow the passage of water therethrough in the widthwise direction. If such filters were installed in the filter chamber 4 so as to be parallel to one another, and an open space was provided at the lower end of every other filter so as to form the serpentine flow path, the water supplied through the passage 7 into the filtration chamber 4 would flow either widthwise through the filters and the vacancies, or along the serpentine path. The aerobic bacteria or activated sludge adhere to the filters, become deposited on the bottom of the filtration tank, or float in the water, thereby purifying the circulating water. Even if the filters should become clogged by means of the accumulated activated sludge, the water flows along the serpentine path and is purified by being in contact with the activated sludge, or the like, as in the foregoing embodiments. Moreover, since the water contains a sufficient amount of oxygen and is constantly passing through the vacancies and the open space, an anaerobic condition is prevented and dirt is converted into activated sludge which contributes to the purification.

By making the filter layers easily demountable, they can be easily replaced or cleaned when they do become ineffective or extremely clogged.

As is obvious from the foregoing description, the inside of the water tank can be constantly maintained in an aerobic state and an extremely high purification efficiency can be obtained according to the present invention, because the intake water from the lower part of the fish-farming water is pre-purified in the storage chamber due to the effect of the activated sludge, and is further efficiently purified in the filtration chamber and discharged along the water surface by means of the discharge mechansim so as to be circulated inside the water tank. Therefore, fish farming can be continued for a long period of time without the necessity of cleaning the filtration chamber or renewing the fish farming water. The present invention is especially useful for the farming of salt-water fish.

In addition, the filtration tank of the present invention is simple in construction and has a high purification efficiency, as noted hereinabove, enabling a relatively small filtration tank to sufficiently purify a large water tank, or the like. Therefore, it can be applied to fish-farming ponds and other large-scale fish-farming installations, as well as the fish-farming water tanks, depending upon the use desired or required.

Obviously, many modifications and variations of the present invention are possible in light of the above teachings. It is therefore to be understood that within the scope of the appended claims, the invention may be practiced otherwise than as specifically described herein.

What is claimed as new and desired to be secured by letters patent of the U.S. is:

1. A filtering system for fish-farming water operatively associated with a water tank, comprising:
    a filtration tank divided into a storage chamber, a filtration chamber, and a discharge chamber by means of partition plates;
    the side length of said filtration tank is less than the width and height thereof;
    the inside of said filtration tank is divided by means of said partition plates in the widthwise direction into said storage chamber and said filtration chamber, and is further divided in the length direction, at one end thereof, so as to provide said discharge chamber;
    a lift pipe is provided within one end of said storage chamber so as to introduce said fish farming water upwardly from said water tank and into said storage chamber;
    means for successively passing the fish-farming water through said storage chamber and said filtration chamber so as to purify said water includes a connecting passage which extends from said storage chamber to said filtration chamber at one lower end of said partition plate separating said storage chamber from said filtration chamber;
    water passages from said filtration chamber to said discharge chamber are provided at the upper part of said partition plate separating said filtration chamber from said discharge chamber;
    vertically disposed planar filters and vacancies allowing water to pass in the widthwise direction are alternately arranged in a parallel fashion in the widthwise direction within said filtration chamber;
    an open space is defined solely above all of said filters and said vacancies within said filtration chamber by disposing the upper ends of all of said filters at a height less than the upper extent of the walls of said filtration tank and said partition plate separating said storage chamber from said filtration chamber so as to permit said water to successively overflow said filters when said filters become clogged in a successive manner in the widthwise direction of said filtration chamber;

the water level within said filtration chamber is normally maintained below the top of said filters, and discharging means disposed within said discharge chamber for discharging said water along the surface of the fish-farming water within said water tank for circulating said water within said water tank.

2. A filtering system for fish-farming water according to claim 1 wherein:

the opening of the lift pipe in said storage chamber is directed along the water surface and in the widthwise direction.

3. A filtering system for fish-farming water according to claim 1 further comprising:

an intake frame, installed at the bottom of said fish farming water within said water tank is fluidically connected to the lower end of said filtration tank.

4. A filtering system for fish-farming water according to claim 1 wherein:

the discharge mechanism of the discharge chamber is provided with a discharge pipe which has an opening directed horizontally along the surface of said fish-farming water within said water tank.

5. A filtering system for fish-farming water according to claim 1, further comprising:

means defining a vertical serpentine flow path within said filtration chamber by means of an open space above the filters and vacancies arranged alternately in the widthwise direction and by disposing the upper end of every other filter at a level higher than the upper ends of the other filters and the water level within the filtration chamber, and means defining a spacing within the bottom of said filtration chamber by disposing said every other filter above the bottom of said filtration tank; and means for passing said water from said storage chamber into said filtration chamber while in contact with the surfaces of said filters so as to filter said water.

6. A filtering system for fish-farming water according to claim 1, further comprising:

means defining a vertical serpentine flow path within said filtration chamber by means of an open space above the water-passing filters and said vacancies arranged alternately in the widthwise direction and disposing the upper end of every other water-passing filters of a level higher than the upper ends of the other water-passing filters and the water level within the filtration chamber, and means defining a spacing within the bottom of said filtration chamber by disposing said every other water-passing filter above the bottom of said filtration tank; and means for passing said water from said storage chamber into said filtration chamber either along said serpentine path or widthwise through said filters.

7. A filtering system for fish-farming water operatively associated with a water tank comprising:

a filtration tank divided into a storage chamber, a filtration chamber, and a discharge chamber by means of partition plates;

water supply means operatively associated with said storage chamber for introducing said fish-farming water upwardly from said water tank and into said storage chamber;

the side length of said filtration tank is less than the width and height thereof;

the inside of the filtration tank is divided by means of said partition plates extending parallel to said side length so as to successively form said storage chamber, said filtration chamber, and said discharge chamber in a linear fashion;

the partition plate separating said storage chamber from said filtration chamber and the partition plate separating said filtration chamber from said discharge chamber are perforated at the upper parts thereof so as to allow water to overflow said plates and flow successively in the width-wise direction;

vertically disposed planar filters and vacancies, for allowing said water to pass in the width-wise direction, are alternately arranged in a parallel manner in the width-wise direction within said filtration chamber;

an open space is defined solely above all of said filters and said vacancies within said filtration chamber by disposing the upper ends of all of said filters at a height less than the upper extent of the walls of said filtration tank and said partition plate separating said storage chamber from said filtration chamber, the upper end of every other filter being disposed at a level higher than the upper ends of the other filters and the water level within the filtration chamber, and said every other filter being disposed above the bottom of said filtration tank, so as to define a vertical serpentine flow path within said filtration chamber and to permit said water to successively overflow said filters when said filters become clogged in a successive manner in the width-wise direction of said filtration chamber;

the water level within said filtration chamber is normally maintained below the top of said filters;

means for passing said water from said storage chamber into said filtration chamber while in contact with the surfaces of said filters so as to filter said water; and discharge means disposed within said discharge chamber for discharging said water along the surface of the fish-farming water within said water tank for circulating said water within said water tank.

8. A filtering system for fish-farming water operatively associated with a water tank comprising:

a filtration tank divided into a storage chamber, a filtration chamber, and a discharge chamber by means of partition plates;

water supply means operatively associated with said storage chamber for introducing said fish-farming water upwardly from said water tank and into said storage chamber;

the side length of said filtration tank is less than the width and height thereof;

the inside of the filtration tank is divided by means of said partition plates extending parallel to said side length so as to successively form said storage chamber, said filtration chamber, and said discharge chamber in a linear fashion;

the partition plate separating said storage chamber from said filtration chamber and the partition plate separating from said filtration chamber from said discharge chamber are perforated at the upper parts thereof so as to allow water to overflow said plates and flow successively in the width-wise direction;

vertically disposed water-passing planar filters and vacancies, for allowing said water to pass in the width-wise direction, are alternately arranged in a parallel manner in the width-wise direction within said filtration chamber;

means defining a vertical serpentine flow path within said filtration chamber by means of an open space above the water-passing filters and vacancies arranged alternately in the width-wise direction by disposing the upper ends of all of said filters at a height less than the upper extent of the walls of said filtration tank and said partition plates separating said storage chamber from said filtration chamber and by disposing the upper end of every other water-passing filter at a level higher than the upper ends of the other water-passing filters and the water level within the filtration chamber, and means defining a spacing within the bottom of said filtration chamber by disposing said every other water-passing filter above the bottom of said filtration tank;

the water level within said filtration chamber is normally maintained below the top of said filters;

means for passing said water from said storage chamber into said filtration chamber either along said serpentine path or width-wise through said filters; and discharge means disposed within said discharge chamber for discharging said water along the surface of the fish-farming water within said water tank for circulating said water within said water tank.

9. In a filtering system for fish-farming water having a filtration tank divided into a storage chamber, a filtration chamber and a discharge chamber, by means of partition plates, in line in a filter tank, and including means for successively passing the fish-farming water through said storage chamber and said filtration chamber so as to purify said water and discharge means disposed within said discharge chamber for discharging said water therefrom, the improvement comprising:

means defining a vertical serpentine flow path within said filtration chamber by means of an open space above a plurality or vertical planar filters and vacancies arranged alternately in the width-wise direction, by disposing the upper ends of all of said filters at a height less than the upper extent of the walls of said filtration chamber and said partition plates separating said storage chamber from said filtration chamber, by disposing the upper end of every other filter at a level higher than the upper ends of the other filters and the water level within the filtration chamber, and disposing said every other filter above the bottom of said filtration chamber.

10. In a filtering system for fish-farming water having a filtration tank divided into a storage chamber, a filtration chamber and a discharge chamber, by means of partition plates, and including means for successively passing the fish-farming water through said storage chamber and said filtration chamber so as to purify said water and discharge means disposed within said discharge chamber for discharging said water therefrom, the improvement comprising:

means defining a vertical serpentine flow path within said filtration chamber by means of an open space above a plurality of vertical planar water-passing filters and vacancies arranged alternately in the width-wise direction, by disposing the upper ends of all of said filters at a height less than the upper extent of the walls of said filtration tank and said partition plates separating said storage chamber from said filtration chamber, by disposing the upper end of every other water-passing filter at a level higher than the upper ends of the other water-passing filters and the water level within the filtration chamber, and by disposing said every other water-passing filter above the bottom of said filtration tank.

* * * * *